United States Patent
Rau et al.

(10) Patent No.: US 11,495,144 B2
(45) Date of Patent: Nov. 8, 2022

(54) APPARATUS AND METHOD FOR CONVERTING INPUT BIT SEQUENCES

(71) Applicant: Infineon Technologies AG, Neubiberg (DE)

(72) Inventors: Markus Rau, Gessertshausen (DE); Stefan Heiss, Bobingen (DE)

(73) Assignee: Infineon Technologies AG, Neubiberg (DE)

( * ) Notice: Subject to any disclaimer, the term of this patent is extended or adjusted under 35 U.S.C. 154(b) by 518 days.

(21) Appl. No.: 16/425,535

(22) Filed: May 29, 2019

(65) Prior Publication Data

US 2019/0371210 A1     Dec. 5, 2019

(30) Foreign Application Priority Data

Jun. 5, 2018 (DE) .......................... 102018208851.9

(51) Int. Cl.
| | |
|---|---|
| *G06F 21/00* | (2013.01) |
| *G09C 1/00* | (2006.01) |
| *G06F 7/72* | (2006.01) |

(52) U.S. Cl.
CPC .............. *G09C 1/00* (2013.01); *G06F 7/729* (2013.01)

(58) Field of Classification Search
CPC .................................. G09C 1/00; G06F 7/729
See application file for complete search history.

(56) References Cited

U.S. PATENT DOCUMENTS

| | | | | |
|---|---|---|---|---|
| 4,264,880 A | * | 4/1981 | Kawashima | ............. H03K 7/08 |
| | | | | 332/109 |
| 5,627,966 A | * | 5/1997 | Hanko | .................... G06F 7/575 |
| | | | | 712/224 |
| 5,850,450 A | | 12/1998 | Schweitzer et al. | |
| 6,172,626 B1 | * | 1/2001 | McDonnell | ............. H03M 9/00 |
| | | | | 341/67 |

(Continued)

OTHER PUBLICATIONS

"Fehlerkorrekturverfahren", Wikipedia, accessed on Feb. 18, 2019 at https://de.wikipedia.org/w/index.php?title=Fehlerkorrekturverfahren&oldid=177514520. Partial English machine translation submitted herewith.

(Continued)

*Primary Examiner* — Philip J Chea
*Assistant Examiner* — Rodman Alexander Mahmoudi
(74) *Attorney, Agent, or Firm* — Murphy, Bilak & Homiller, PLLC

(57) ABSTRACT

A cryptographical apparatus for converting input bit sequences, whose overflow-free arithmetic addition results in a secret, into output bit sequences whose logic XORing results in the secret. The apparatus comprises a data interface for providing a first input bit sequence and a second input bit sequence and a processing circuit configured to a) gate the first input bit sequence and the second input bit sequence to obtain a logic result indicating overflow bit positions at which both the first input bit sequence and the second input bit sequence have a value of one; and to b) change the first and/or second input bit sequence at at least one overflow bit position. The processing circuit is configured to repeatedly perform steps a) and b) by using the respectively changed input bit sequences, until the logic result indicates no further overflow bit position and the output bit sequences are obtained.

26 Claims, 15 Drawing Sheets

(56) References Cited

U.S. PATENT DOCUMENTS

| | | | |
|---|---|---|---|
| 6,804,355 B1* | 10/2004 | Graunke | H04L 9/0643 |
| | | | 380/37 |
| 9,813,243 B1 | 11/2017 | Triandopoulos et al. | |
| 2002/0059351 A1* | 5/2002 | Shiraishi | H03H 17/0219 |
| | | | 708/306 |
| 2005/0138101 A1 | 6/2005 | Tang et al. | |
| 2015/0089223 A1* | 3/2015 | Tasher | H04L 63/0428 |
| | | | 713/168 |
| 2015/0100760 A1 | 4/2015 | Loktyukhin et al. | |
| 2017/0293471 A1* | 10/2017 | Hormigo Aguilar | G06F 7/483 |

OTHER PUBLICATIONS

"Overflow Flag", Wikipedia, accessed on Feb. 18, 2019 at https://en.wikipedia.org/w/index.php?title=Overflow_flag&oldid=837872506.

* cited by examiner

1) Input:   $a_1 \in [0; 2^n[$

2) Input:   $a_2 \in [0; 2^n[$

3) Output: $x_1 \in [0; 2^n[$

4) Output: $x_2 \in [0; 2^n[$, so that $x_1 \oplus x_2 = (a_1 + a_2) \bmod 2^n$

5)    $x_1 = a_1$

6)    $x_2 = a_2$

7)    $AND = x_1 \wedge x_2$ 8)    while $AND \neq 0$ do

9)       $rnd = rand \in [0; 2^n[$ 10)      if $rnd == 0$ then

11)         $AND = 0 + AND$ 12)      else

13)         $AND = 0 - AND$ 14)      end if

15)      $x_1 = (x_1 + AND) \bmod 2^n$

16)      $x_2 = (x_2 - AND) \bmod 2^n$

17)      $AND = x_1 \wedge x_2$ 18)   end while 19)   return $(x_1, x_2)$

Fig. 4

1) Input: $a_1 \in [0; 2^n[$

2) Input: $a_2 \in [0; 2^n[$

3) Output: $x_1 \in [0; 2^n[$

4) Output: $x_2 \in [0; 2^n[$, so that $x_1 \oplus x_2 = (a_1 + a_2) \bmod 2^n$

5)     $x_1 = a_1$

6)     $x_2 = a_2$

7)     $AND = x_1 \wedge x_2$

8)     $m = getBitMask(AND)$ 9)     while $AND \neq 0$ do

10)         $x_1 = (x_1 + AND) \bmod 2^n$

11)         $x_2 = (x_2 - AND) \bmod 2^n$

12)         $AND = x_1 \wedge x_2 \wedge (2^n - m - 1)$

13)         $m = getBitMask(AND)$

14)         $rnd = rand \in [0; 2^n[$

15)         $x_1 = x_1 \oplus (rnd \wedge m)$

16)         $x_2 = x_2 \oplus (rnd \wedge m)$ 17)     end while 18)     return $(x_1, x_2)$

1) Input:   $y \in [1; 2^n[$
2) Output: $m \in [0; 2^n[$, so $(m + 1) = 2^k$ with k is position of lowest 1-bit in y
3) $\quad m = 2^n - y \bmod 2^n$
4) $\quad m = m \wedge y$
5) $\quad m = m - 1$
6) $\quad$ return m

1) Input:   $a_1 \in [0; 2^n[$
2) Input:   $a_2 \in [0; 2^n[$
3) Output: $x_1 \in [0; 2^n[$
4) Output: $x_2 \in [0; 2^n[$, so that $x_1 \oplus x_2 = (a_1 + a_2) \bmod 2^n$
5) $\quad x_1 = a_1$
6) $\quad x_2 = a_2$
7) $\quad AND = x_1 \wedge x_2$
8) $\quad$ while $AND \neq 0$ do
9) $\quad\quad m = \text{getBitMask}(AND)$
10) $\quad\quad rnd = rand \in [0; 2^n[$
11) $\quad\quad rnd = rnd \wedge (2^n - m - 1)$
12) $\quad\quad rnd = rnd \vee (m + 1)$
13) $\quad\quad x_1 = (x_1 + rnd) \bmod 2^n$
14) $\quad\quad x_2 = (x_2 - rnd) \bmod 2^n$
15) $\quad\quad AND = x_1 \wedge x_2$
16) $\quad$ end while
17) $\quad$ return $(x_1, x_2)$

1) Input:  $a_1 \in [0; 2^n[$
2) Input:  $a_2 \in [0; 2^n[$
3) Output: $x_1 \in [0; 2^n[$
4) Output: $x_2 \in [0; 2^n[$, so $x_1 \oplus x_2 = (a_1 + a_2) \bmod 2^n$
5)     $x_1 = a_1$
6)     $x_2 = a_2$
7)     $rnd = rand \in [0; 2^n[$
8)     $msk = rand \in \{1; 3\}$
9)     $AND = (x_1 \wedge x_2) \,|\, (rnd \wedge msk)$
10)    while $AND \neq 0$ do
11)        $x_1 = (x_1 + AND) \bmod 2^n$
12)        $x_2 = (x_2 - AND) \bmod 2^n$
13)        $AND = (x_1 \wedge x_2) \,|\, (rnd \wedge msk)$
14)        $msk = 2 * msk) \bmod 2^n$
15)    end while
16)    return $(x_1, x_2)$

1100

1) Input: $a_1 \in [0; 2^n[$

2) Input: $a_2 \in [0; 2^n[$

3) Output: $x_1 \in [0; 2^n[$

4) Output: $x_2 \in [0; 2^n[$, so $x_1 \oplus x_2 = (a_1 + a_2) \bmod 2^n$

5)    $x_1 = a_1$

6)    $x_2 = a_2$ 7)    msk = 3

8)    while msk ≠ 0 do

9)       AND = $(x_1 \wedge \text{msk}) \wedge x_2$ 10)      tba = $(((x_1 \wedge \text{msk})(x_2 \wedge \text{msk})) \wedge (\text{AND} << 1)$ 11)      $x_1 = (x_1 + \text{AND}) \bmod 2^n$ 12)      $x_2 = (x_2 - \text{AND}) \bmod 2^n$ 13)      tba = $(((\text{tba} \wedge x_1) \wedge x_2) << 1) \bmod 2^n$ 14)      $x_1 = (x_1 + \text{tba}) \bmod 2^n$ 15)      msk = (msk << 2) $\bmod 2^n$ 16)    end while 17)    return $(x_1, x_2)$

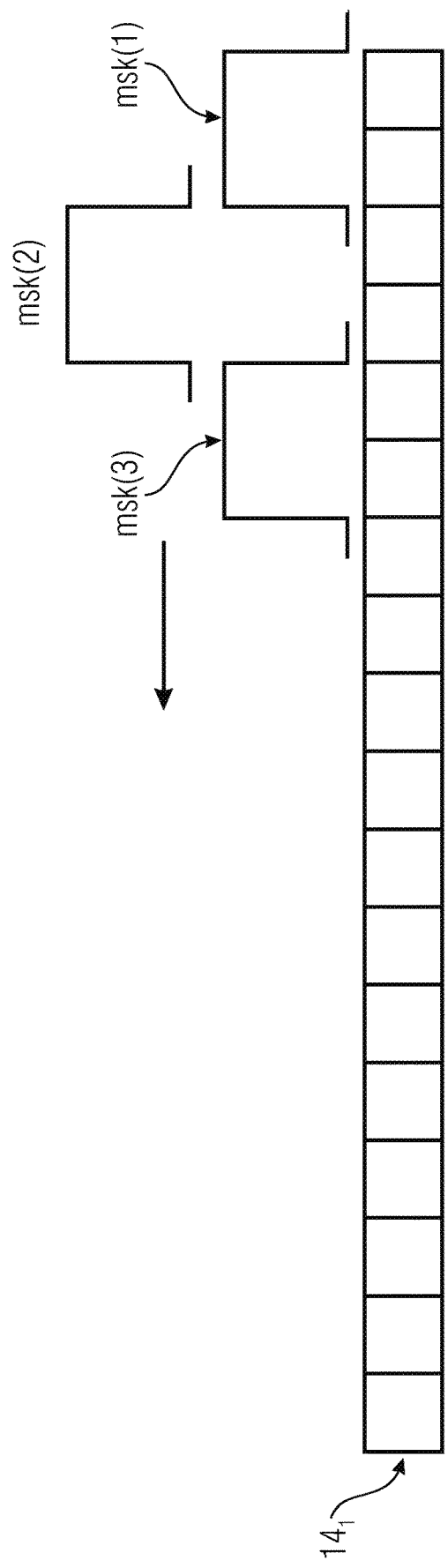

1300

1) Input: $a_1 \in [0; 2^n[$

2) Input: $a_2 \in [0; 2^n[$

3) Input: $a_3 \in [0; 2^n[$

4) Output: $x_1 \in [0; 2^n[$

5) Output: $x_2 \in [0; 2^n[$

6) Output: $x_3 \in [0; 2^n[$, so that $x_1 \oplus x_2 \oplus x_3 = (a_1 + a_2 + a_3) \bmod 2^n$ 7) $\quad x_1 = a_1$ 8) $\quad x_2 = a_2$ 9) $\quad x_3 = a_3$ 10) $\quad \text{AND} = (x_1 \wedge x_2) \vee (x_2 \wedge x_3) \vee (x_3 \wedge x_1)$ 11) $\quad m = \text{getBitMask}(2 * \text{AND})$ 12) $\quad \text{while AND} \neq 0 \text{ do}$ 13) $\quad\quad \text{AND} = \text{AND} \wedge (2^n - m - 1)$ 14) $\quad\quad x_1 = (x_1 + \text{AND} + m + 1) \bmod 2^n$ 15) $\quad\quad x_2 = (x_2 - \text{AND}) \bmod 2^n$ 16) $\quad\quad \text{AND} = (x_1 \wedge x_2) \vee (x_2 \wedge x_3) \vee (x_3 \wedge x_1)$ 17) $\quad\quad \text{AND} = \text{AND} \wedge (2^n - m - 1)$ 18) $\quad\quad m = \text{getBitMask}(2 \times \text{AND})$ 19) $\quad \text{end while}$ 20) $\quad \text{return } (x_1, x_2, x_3)$

1) Input: $a_1 \in [0; 2^n[$

2) Input: $a_2 \in [0; 2^n[$

3) Input: $a_3 \in [0; 2^n[$

4) Output: $x_1 \in [0; 2^n[$

5) Output: $x_2 \in [0; 2^n[$

6) Output: $x_3 \in [0; 2^n[$, so that $x_1 \oplus x_2 \oplus x_3 = (a_1 + a_2 + a_3) \bmod 2^n$ 7)    $x_1 = a_1$ 8)    $x_2 = a_2$ 9)    $x_3 = a_3$

22 →

10)    $\text{AND} = (x_1 \wedge x_2) \vee (x_2 \wedge x_3) \vee (x_3 \wedge x_1)$ 11)    $m = \text{getBitMask}(2 * \text{AND})$ 12)    while AND $\neq 0$ do    42

13)       $x_1 = (x_1 + \overbrace{(2 * (\text{AND} \wedge m))}) \bmod 2^n$

14)       $\text{AND} = (x_1 \wedge x_2) \vee (x_2 \wedge x_3) \vee (x_3 \wedge x_1)$ 15)       $\text{AND} = \text{AND} \wedge (2^n - m - 1)$ 16)       $m = \text{getBitMask}(2 * \text{AND})$ 17)    end while 18)    return $(x_1, x_2, x_3)$

Fig. 14

1) Input: $a_1 \in [0; 2^n[$   —$14_1$
2) Input: $a_2 \in [0; 2^n[$   —$14_2$
3) Input: $a_3 \in [0; 2^n[$   —$14_3$
4) Input: $a_4 \in [0; 2^n[$   —$14_4$
5) Output: $x_1 \in [0; 2^n[$
6) Output: $x_2 \in [0; 2^n[$
7) Output: $x_3 \in [0; 2^n[$
8) Output: $x_4 \in [0; 2^n[$, so that $x_1 \oplus x_2 \oplus x_3 \oplus x_4 = (a_1 + a_2 + a_3 + a_4) \bmod 2^n$
9)     $x_1 = a_1$
10)    $x_2 = a_2$
11)    $x_3 = a_3$
12)    $x_4 = a_4$
13)    $AND1 = (x_1 \wedge x_2) \vee (x_1 \wedge x_3) \vee (x_1 \wedge x_4) \vee (x_2 \wedge x_3) \vee (x_2 \wedge x_4) \vee (x_3 \wedge x_4)$   —$22_1$
14)    $AND2 = x_1 \wedge x_2 \wedge x_3 \wedge x_4$   —$22_2$
15)    $m = \text{getBitMask}(2 * AND)$
16)    while $AND \neq 0$ do
17)        $x_1 = (x_1 + ((AND1 \wedge (AND2 \oplus (2^n - 1)) \wedge m) << 1)) \bmod 2^n$
18)        $x_2 = (x_2 + ((AND2 \wedge m) << 2)) \bmod 2^n$
19)        $AND1 = (x_1 \wedge x_2) \vee (x_1 \wedge x_3) \vee (x_1 \wedge x_4) \vee (x_2 \wedge x_3) \vee (x_2 \wedge x_4) \vee (x_3 \wedge x_4)$
20)        $AND2 = x_1 \wedge x_2 \wedge x_3 \wedge x_4$
21)        $AND1 = AND1 \wedge (2^n - m - 1)$
22)        $AND2 = AND2 \wedge (2^n - m - 1)$
23)        $m = \text{getBitMask}(2 * AND)$
24)    end while
25)    return $(x_1, x_2, x_3, x_4)$

APPARATUS AND METHOD FOR CONVERTING INPUT BIT SEQUENCES

TECHNICAL FIELD

The present disclosure relates to a cryptographical apparatus and to a method for converting input bit sequences, in particular input bit sequences that describe an additive share of a secret, into shares processible in the XOR domain. The present disclosure relates in particular to a randomized transformation of a data masking.

DESCRIPTION

In security controllers, for example chip card control devices, there is a need to protect data against side channel analyses by malicious attackers. This can be effected by implementing masking, to protect security-critical data while the data are processed. Depending on the application area, masking based on an addition (ADD) computation operation or an exclusive-OR (XOR) computation operation can be used. While additive masking is widely used in the field of asymmetric cryptography, the use of XORing is prevalent in the field of symmetric cryptography.

It would be desirable to have techniques and apparatuses that allow both ADD and XOR computation operations to be used.

SUMMARY

Exemplary embodiments provide a cryptographical apparatus for converting input bit sequences, whose overflow-free arithmetic addition results in a secret, into output bit sequences whose logic XORing results in the secret. The cryptographical apparatus comprises a data interface for providing at least a first input bit sequence and a second input bit sequence. The cryptographical apparatus further comprises a processing circuit configured to a) gate the first input bit sequence and the second input bit sequence in order to obtain a logic result indicating overflow bit positions at which both the first input bit sequence and the second input bit sequence have a value of one (1), and to b) change the first input bit sequence and/or the second input bit sequence at at least one overflow bit position. The processing circuit is configured to repeatedly perform steps a) and b) by using the respectively changed input bit sequences, until the logic result indicates no further overflow bit position and the output bit sequences are obtained. This allows either or both ADD computation operations and XOR computation operations to be used for the same secret or protection-worthy data, since the input bit sequences can be converted from the ADD domain to the XOR domain as required. At the same time, the processing of unmasked secret data can be prevented.

According to one exemplary embodiment, a system comprises a cryptographical apparatus described herein. Such a system may be for example an applicable data-processing apparatus, for example an authentication system or a communication system.

One exemplary embodiment provides a method for converting input bit sequences, whose overflow-free arithmetic addition results in a secret, into output bit sequences whose logic XORing results in the secret. The method comprises providing at least a first input bit sequence and a second input bit sequence. The method comprises a) gating the first input bit sequence and the second input bit sequence to obtain a logic result indicating overflow bit positions at which both the first input bit sequence and the second input bit sequence have a value of one (1). The method comprises b) changing the first input bit sequence and/or the second input bit sequence at at least one overflow bit position. The method comprises repeatedly performing steps a) and b) by using the respectively changed input bit sequences, until the logic result indicates no further overflow bit position and the output bit sequences are obtained.

BRIEF DESCRIPTION OF THE FIGURES

Exemplary embodiments are explained below with reference to the accompanying drawings, in which:

FIG. 4 shows a schematic depiction of a method according to one exemplary embodiment on the basis of a pseudo code having additional method steps for transposing calculations;

FIG. 5a shows a schematic depiction of a method according to one exemplary embodiment for randomizing already checked bits in output bit sequences;

FIG. 5b shows a schematic depiction of values and variables that can be obtained during a pass of the method from FIG. 5a;

FIG. 6 shows a schematic depiction of a method 600 for obtaining a bit mask according to one exemplary embodiment;

FIG. 7 shows a schematic depiction of a pseudo code of a method according to one exemplary embodiment, in which the input bit sequences are converted into the output bit sequences and, further, unchecked bits are randomized;

FIG. 11 shows a schematic depiction of a method according to one exemplary embodiment, in which a window technique is used to select parts of the input bit sequences;

FIG. 12 shows a schematic diagram to illustrate the window function from FIG. 11;

FIG. 13 shows a schematic depiction of a method according to one exemplary embodiment in pseudo codes, in which an increased number of three input bit sequences is used to obtain output bit sequences;

FIG. 14 shows a schematic depiction of a method according to one exemplary embodiment, in which merely one of three input bit sequences is altered during a conversion into output bit sequences;

FIG. 15 shows a schematic depiction of a method according to one exemplary embodiment in the pseudo code, in which four input bit sequences are used.

DETAILED DESCRIPTION

Before exemplary embodiments are explained in more specific detail below on the basis of the drawings, it is pointed out that elements, objects and/or structures that are identical, have the same function or have the same effect are provided with the same reference signs in the different figures, which means that the description of these elements depicted in the different exemplary embodiments is interchangeable or can be applied to one another.

Some of the exemplary embodiments described below relate to cryptographical apparatuses. An example of a cryptographical apparatus is a security controller configured to process secret or protection-worthy data. A secret may be, for example, at least part of a key. The data can be present in masked fashion in this case and can also be processed in masked fashion, so that the presence of unmasked data can be avoided.

Some of the exemplary embodiments described below relate to an AND operation. For an AND combination of 2 bits, said operation describes a logic 1 for the case in which the first bit and the second bit, that is to say, both bits, have a logic 1.

Some of the exemplary embodiments described below relate to an XOR operation. This describes an Exclusive-ORing of two bits, which yields 1 only if only one of the two bits has a logic 1.

Figure 1:
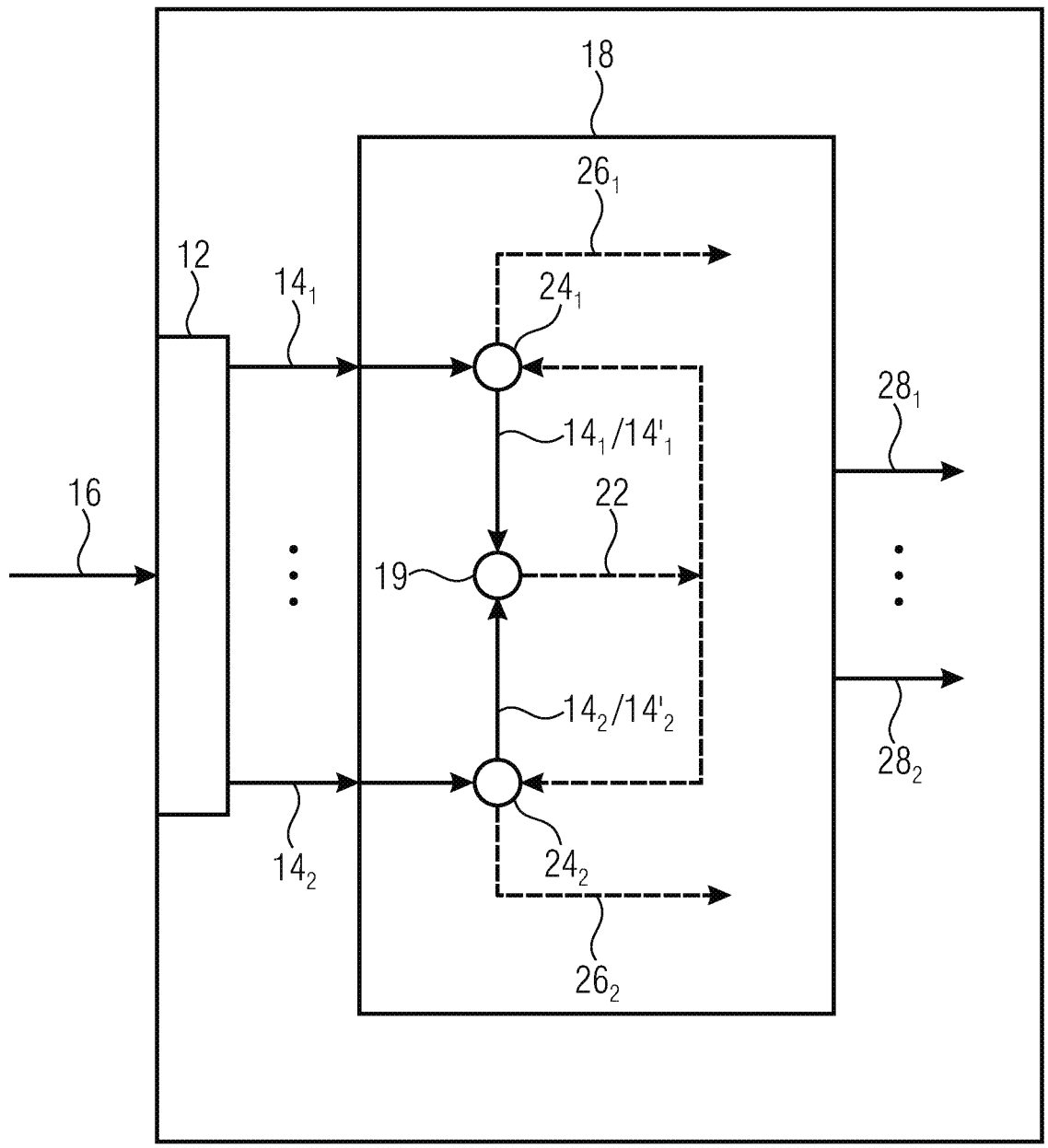
FIG. 1 shows a schematic block diagram of a cryptographical apparatus according to one exemplary embodiment.

FIG. 1 shows a schematic block diagram of a cryptographical apparatus 10 according to one exemplary embodiment. The cryptographical apparatus 10 comprises a data interface 12 for providing at least a first input bit sequence 14$_1$ and a second input bit sequence 14$_2$, which are able to be obtained for example based on a data signal 16 that can be sent from a data source or a data memory. For the transmission of the data signal 16, it is possible for a wireless or wired interface to be used, for example a data bus.

The cryptographical apparatus 10 comprises a processing circuit 18. The processing circuit 18 can comprise a logic gate 19 configured to gate provided input bit sequences 14$_1$ and 14$_2$ with one another in order to obtain a logic result 22. The logic result 22 indicates overflow bit positions at which both the input bit sequence 14$_1$ and the input bit sequence 14$_2$ have a value of one. At individual bit positions, each of the input bit sequences 14$_1$ and 14$_2$ can have a value of logic zero or logic one. The logic function may be, for example, an AND function that is used for bit-by-bit gating of the input bit sequences 14$_1$ and 14$_2$. Bit-by-bit gating can mean that, in a stipulated order, for example from a least significant or least influential bit (LSB) to a most significant or most influential bit (MSB), the other way around or according to a different rule, two concordant bits of the input bit sequences 14$_1$ and 14$_2$ can be compared with one another or gated with one another in order to obtain part of the logic result 22. The ANDing in the AND operation yields a logic zero if at least one of the input bit sequences 14$_1$ and/or 14$_2$ has a value of zero at the respective bit position, and yields a value of logic one if both bit sequences have a value of one. The logic result 22 may be a bit sequence that has a logic one at the places at which both the input bit sequence 14$_1$ and the input bit sequence 14$_2$ have a value of one.

The processing circuit 18 may be configured to change at least one of the input bit sequences 14$_1$ and/or 14$_2$ at least one of the overflow bit positions indicated in the logic result 22. This can be accomplished by virtue of information from the logic result 22 being passed to bit change circuits 24$_1$ and/or 24$_2$ that are configured to change the input bit sequence 14$_1$ or 14$_2$.

The processing circuit 22 is configured to repeatedly perform the gating by means of the logic gate 19 and the changing of the input bit sequences 14$_1$ and 14$_2$ by using the respectively changed input bit sequences 14'$_1$ and 14'$_2$ until the logic result 22 indicates no further overflow bit position and output bit sequences 26$_1$ and 26$_2$ are obtained.

The repeated performance of said operations can be implemented in the form of a loop repetition or the like, so that an input bit sequence 14$_i$ that has been changed to a changed input bit sequence 14'$_i$ can be used as a new input bit sequence in a subsequent loop repetition. Optionally, still further processing steps can be effected. The output bit sequences 26$_1$ and 26$_2$ can correspond to the changed input bit sequence 14'$_i$ of a last loop pass or can at least be based thereon.

The cryptographical apparatus 10 is configured to convert input bit sequences whose overflow-free arithmetic addition results in a secret into the output bit sequences 26$_i$ such that the logic XORing thereof likewise results in the secret. Overflow-free arithmetic addition can be understood to mean addition of the bit sequences in combination with a mod $2^n$ operation, which means that the represented values are added, but an overflow possibly produced thereby is ignored.

The processing circuit 18 may be configured to provide bit sequences 28$_1$ and 28$_2$ that are an altered or manipulated representation of the input bit sequences 14$_1$ and 14$_2$ and for example can be used for an XOR operation, but in this case represent the same secret obtained by means of the overflow-free arithmetic addition of the input bit sequences 14$_1$ and 14$_2$.

The cryptographical apparatus 10 may be formed for example as a security controller, as are used in chip cards or the like, for example. The apparatus can have specific security-adapted hardware, for example a CPU having appropriate interfaces.

Figure 2:
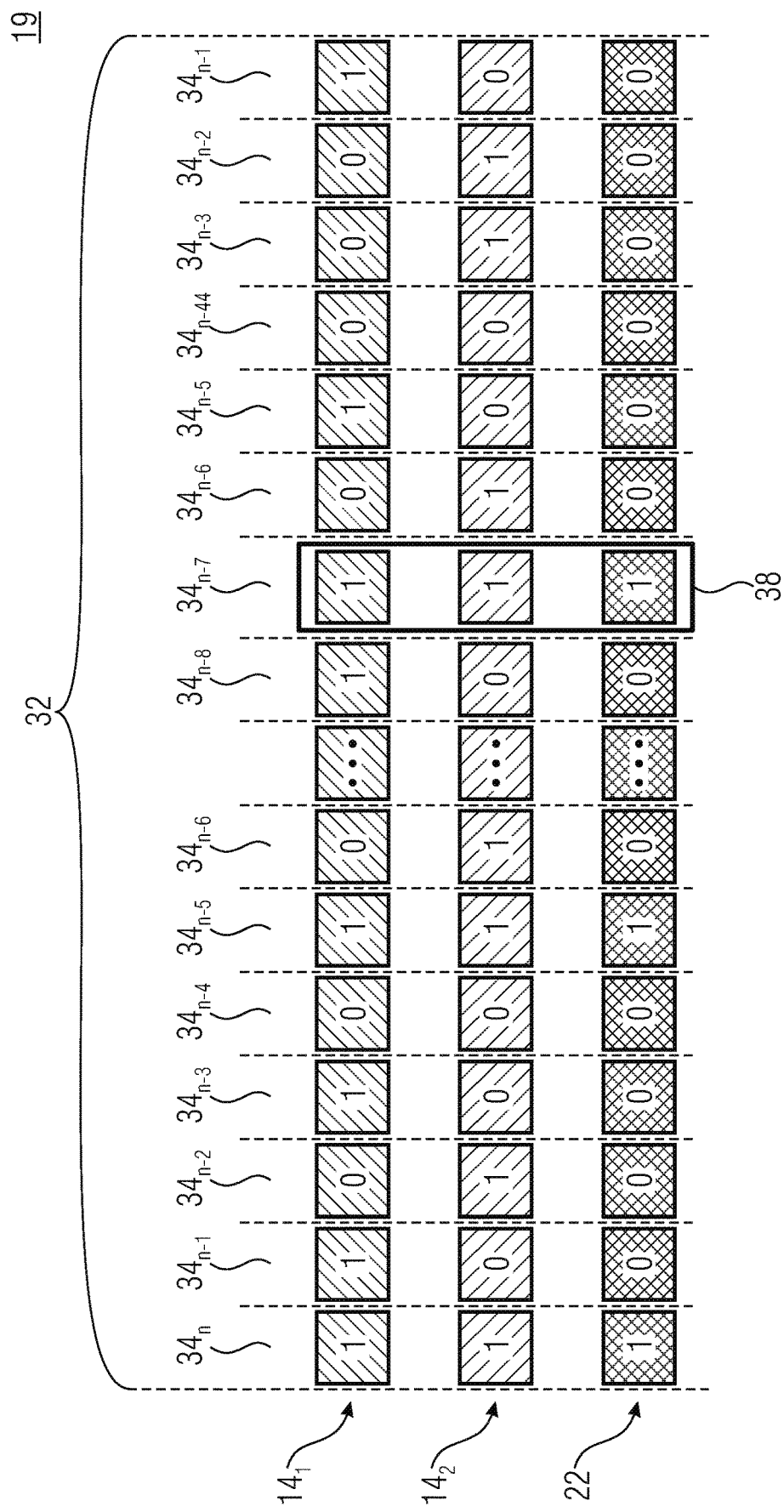
FIG. 2 shows a schematic diagram to illustrate an operation of a logic gate of the cryptographical apparatus to obtain a logic result according to one exemplary embodiment.

FIG. 2 shows a schematic diagram to illustrate an operation of the logic gate 19 to obtain the logic result 22 in the processing circuit 18. The input bit sequences 14$_1$ and 14$_2$ can be obtained with an arbitrary but preferably concordant bit length 32, these having an applicable number of n bit positions 34$_1$ to 34$_n$.

The processing circuit 18 may be configured to perform bit-by-bit ANDing on a bit-by-bit basis, for each of the bit positions 34$_i$ at concordant positions in the input bit sequences 14$_1$ and 14$_2$, in order to obtain the logic result 22. The exemplary input bit sequences 14$_1$ and 14$_2$ depicted have a logic one concordantly at the bit positions 34$_7$, 34$_{n-5}$ and 34$_n$, for example, so that the logic result likewise has a one at these bit positions 34$_7$, 34$_{n-5}$ and 34$_n$. At the other bit positions, at least one of the input bit sequences 14$_1$ or 14$_2$ has a logic zero, which means that the logic result 22 likewise has a zero in this case.

At the bit positions 34$_7$, 34$_{n-5}$ and 34$_n$, the logic result 22 indicates an overflow bit position. At the applicable bit positions, an arithmetic addition of the input bit sequences 14$_1$ and 14$_2$ results in an overflow that leads to an adjacent bit position, for example the bit position 34$_8$ or 34$_{n-3}$, which would lead to a divergence between the result of the addition and a result of the XOR operation.

The processing circuit 18 is configured to change the input bit sequence 14$_1$ and/or 14$_2$ at the location of at least one overflow bit position. If, for example, the bit position 34$_7$ is considered, an arbitrary change in the input bit sequence $14_1$ and/or in the input bit sequence $14_2$ at this location can cause the logic result 22 to indicate no further overflow at the bit positions $34_7$, which means that the divergence between the addition operation and the XOR operation can be removed at this point. This allows output bit sequences to be obtained by adapting the input bit sequences, which means conversion of the bit sequences so that the altered input bit sequences are also usable for XOR operations.

Exemplary embodiments are based on a transformation from additive shares of a secret to XOR shares by using an addition operation or a subtraction operation and also logic operations. Based on a fundamental functional method, this provides multiple opportunities for obtaining a randomization. Irrespective of this, the option of transformation using a higher number of shares (input bit sequences), for example more than two, more than three, more than four or a high number, provides the opportunity to strengthen an operation even against side channel attacks of a higher order.

Figure 3:
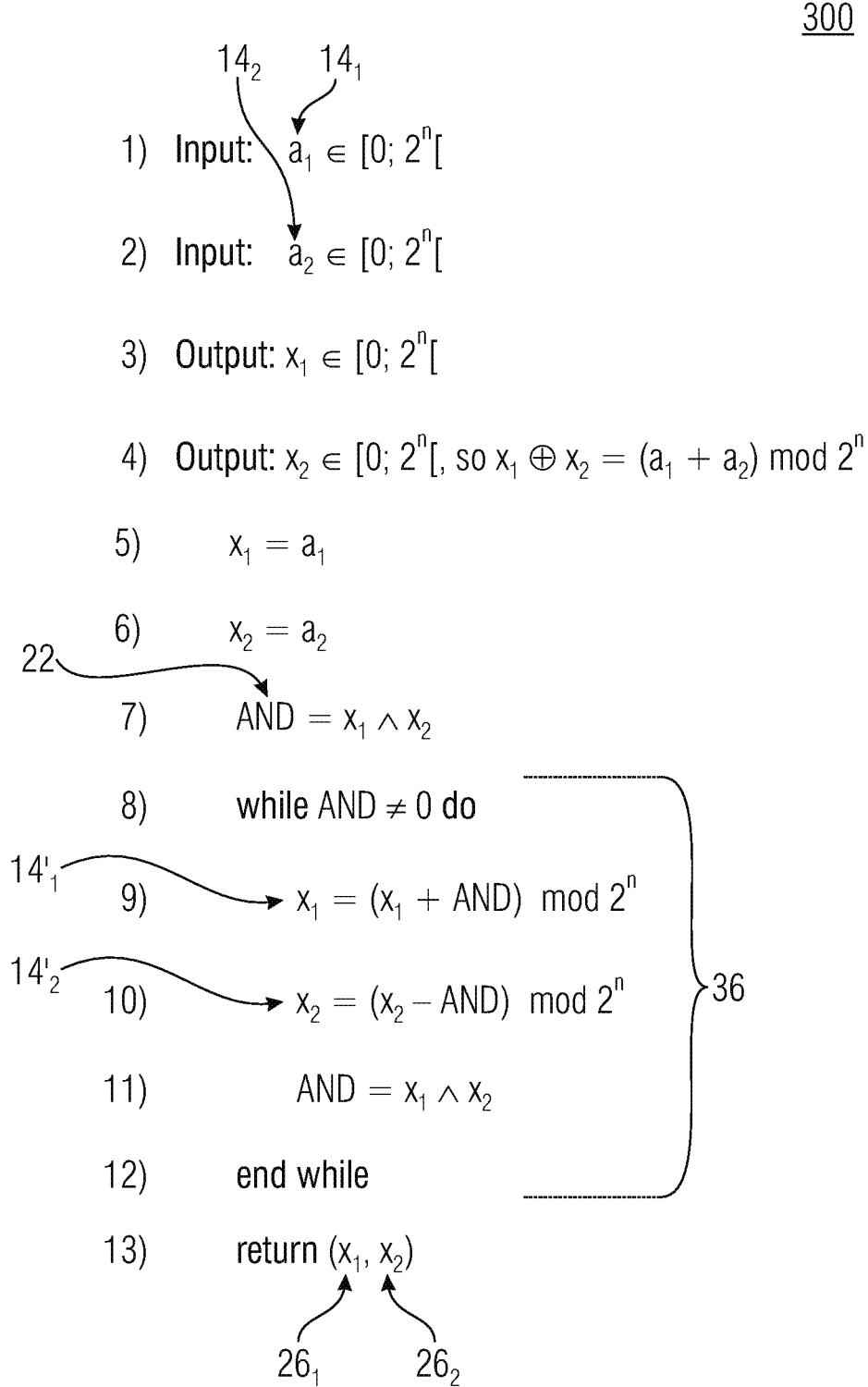
FIG. 3 shows a schematic depiction of a method, for example performed by a processing device, according to one exemplary embodiment in the form of a pseudo code.

FIG. 3 shows a schematic depiction of a method 300, for example performed by the processing device 18, according to one exemplary embodiment in the form of a pseudo code. The pseudo code explained in connection with exemplary embodiments described herein is used to illustrate the exemplary embodiments described herein. However, the depicted code is not intended to be understood to mean that it prescribes a particular command sequence, a programing language, or the explicit use of a software component to obtain the respective function. Rather, at least some of the operations described herein may also be implemented as hardware, for example by means of hardwiring or the like.

In lines 1 and 2, for example the input bit sequences $14_1$ and $14_2$ are obtained and denoted as bit sequences $a_1$ and $a_2$, which can have an arbitrary value between zero (all bits have a value of logic zero) and $2^n-1$ (all bits have a value of logic one), wherein the input bit sequences $14_1$ and $14_2$ can have the same or different values.

In lines 3 and 4, variables $x_1$ and $x_2$ are defined, which are output, after a complete pass of the method, in line 13 as output bit sequences $26_1$ and $26_2$ and then satisfy the condition that an XORing of the output bit sequences $26_1$ and $26_2$, which is represented by $\oplus$, corresponds to the arithmetic addition, represented by +, of the input bit sequences, in particular to an overflow-free arithmetic addition of the input bit sequences that is obtained by means of the mod $2^n$ operation.

Alternatively, in lines 5 and 6, the input bit sequences $14_1$ and $14_2$ can be buffer-stored in the variables $x_1$ and $x_2$. In line 7, the logic result 22 is obtained by means of bit-by-bit ANDing of the input bit sequences, or the buffer-stored version thereof.

In line 8, a check is performed to determine whether the logic result 22 has at least one bit position at which a value not equal to zero is obtained, this being able to be obtained by virtue of a check being performed to determine whether a value represented by the logic result 22 is not equal to zero. This check can be performed on a bit-by-bit basis, for example in ascending order of the bit positions $34_1$ to $34_n$.

A cryptographical apparatus according to one exemplary embodiment may be embodied such that the processing circuit is configured to change the first input bit sequence and/or the second input bit sequence at the at least one overflow bit position by calculating a correction bit sequence based on the logic result and adding the correction bit sequence to a first and a second input bit sequence and subtracting it from the other input bit sequence or adding it to an inverse correction bit sequence. In lines 9 and 10, the input bit sequences are altered to obtain the modified or altered input bit sequences $14'_1$ and $14'_2$. By way of example, the input bit sequence $14_1$ has the value of the logic result added to it and any overflow removed. A value of the logic result 22 can be subtracted from the input bit sequence $14_2$ in order to obtain the altered input bit sequence $14'_2$. The addition and/or the subtraction can be effected in overflow-free fashion in this case, which means combined with a modulo $2^n$ operation. As is also evident from the explanations pertaining to FIG. 2, the increase in the value of one of the input bit sequences and/or the decrease in the value of the other bit sequence can be indicated by virtue of the bit sequence of the logic result 22 having a predefined value, for example 1, at an applicable bit position. Alternatively, another value can also be used in order to indicate an applicable position, for example by means of inversion of the logic result 22. If the logic result does not have the predefined value at an applicable analyzed place, then the processing device may be configured to leave the input bit sequences used unaltered, at least for the latest repetition.

The logic result 22 can be used to obtain a further correction bit sequence that is used for addition and/or subtraction. The addition and/or subtraction can be effected on a bit-by-bit basis in this case. Alternatively, the whole bit sequence can also be added or subtracted.

This means that the processing circuit can change the input bit sequence $14_1$ and/or $14_2$ at the at least one overflow bit position by calculating a correction bit sequence based on the logic result and, according to one exemplary embodiment, adding either the first input bit sequence or the second input bit sequence to the correction bit sequence.

In line 11, the logic result 22 can be calculated again, with the altered input bit sequences $14'_1$ and $14'_2$ being able to be used for calculation. This allows a fresh assessment of whether a loop 36 for adapting the input bit sequences is performed again. The loop 36 can be repeated until the logic result 22 indicates no further overflow bit position. In that case, the input bit sequences $26_1$ and $26_2$ can be output. As described on the basis of the loop 36, a repetition can be obtained by repeatedly performing loop passes of the loop 36 or adapted forms thereof. In this case, it is possible to configure the cryptographical apparatus such that the changed bit sequences $14'_1$ and $14'_2$ of a loop pass are used as an input bit sequence for a subsequent further loop pass.

In other words, FIG. 3 shows a fundamental method or basic method. The method operates as follows: the two additive shares, the input bit sequences $14_1$ and $14_2$, are iteratively modified into XOR shares by repeatedly executing at least the loop 36, by adding a value to one share (input bit sequence) and subtracting the same value from the other share (input bit sequence). As a result, the sum of the two shares remains the same, while the distribution of the two shares is modified. The value to be added/subtracted may be the same as the logic AND of the two shares, and therefore the loop ends in any case if the logic AND of the two shares is zero. At this point, the distribution of the additive shares is adjusted such that addition of the two shares leads to the same value as calculating the Exclusive-OR (XOR) using the two shares. Some or preferably all operations can be performed modulo $2^n$, so that the adding/subtracting of a value of shares does not lead to an overflow for higher bits. The overflow can therefore be ignored, and this is explicitly achieved by calculating modulo $2^n$.

The method works in this case such that the distribution of the two additive shares is iteratively modified such that ultimately two additive shares are obtained that represent the same sum, but have no 1 bits at the same position. Therefore, the method considers this position (by calculating $a_1 \wedge a_2$, where the symbol A symbolizes the logic bit-by-bit AND-ing) and adjusts the distribution by adding/subtracting the changeable considered bit. This modification can be repeated until the two shares have no 1 bit at an identical position.

The method affords the advantage that there is the assurance that a result can be obtained in a finite time. With numbers of less than $2^n$, the method ends after no more than n loops, i.e. when $a_1 \wedge a_2$ is equal to zero. If the position of the lowest 1-bit of $a_1 \wedge a_2$ is considered in an arbitrary iteration, for example, then a situation is considered in which both bits from and in this position are one. The adding of the two bits leads to a different value than an XOR operation would. The addition of the AND value, of the logic result, to one share and the subtracting of the same from another share leads to shares having a 0-bit (bit representing a logic zero) at this position, while the value of the sum is retained. The addition/subtraction does not modify the bits beneath the considered bit, for example less significant bits of the two shares. Therefore, the lowest 1-bit of the freshly calculated AND value has at least the value that it already had on the last iteration, or a higher value. Since the addition/subtraction generates two 0-bits at the considered position, the position of the bit to be considered is higher in the next iteration. That is to say that from iteration to iteration the result of $a_1 \wedge a_2$ has increasingly more trailing 0-bits until the result itself yields zero. Therefore, the algorithm ends in no more than n iterations, i.e., repetitions.

According to one exemplary embodiment, the processing circuit is configured to decrease a value represented by the first input bit sequence $14_1$ in a first loop pass or a first repetition, for example the hile loop, and to use the obtained bit sequence $14'_1$ with the decreased value as an input bit sequence in a later loop pass, wherein the processing circuit is configured to increase the decreased value in the subsequent loop pass. This means that the stipulation, illustrated in connection with FIG. 3, within the While loop for the addition and subtraction may be variable over time.

An example of this is depicted in connection with FIG. 4, which schematically depicts a method 400 on the basis of a pseudo code that, in comparison with the pseudo code from FIG. 3, can have an additional code module, which means additional method steps, in lines 9-14. In line 9, a random number is obtained that can have a value of 0 or 1, for example. On the basis of the random number, lines 10 to 14 define whether or not the logic result 22 in line 13 is inverted in the case of the random number=1, see line 11 of the pseudo code. The inversion, which means a change of arithmetic sign, likewise inverts the addition or subtraction in lines 15 and 16, so that the addition in line 15 can produce a subtraction, for example, and the subtraction in line 16 can produce an addition. The random number can be re-determined in each iteration, as is effected in line 9. Alternatively, the stipulation can also be made just once for all of the loop passes or repetitions.

The inversion of the logic result 22 is one of multiple options. Alternatively, the variables $x_1$ and $x_2$ could also be transposed and subjected to different operations, addition and subtraction, in different repetitions.

As an alternative to the use of a random number, it is also possible for a, possibly secret, scheme to be used in order to increase or decrease an input bit sequence or an altered version thereof in different repetitions.

In other words, there is no need to always add the same share or to subtract from the same share. Since it may be sufficient for the sum of the bits that have at least the bit position, such as the currently considered bit, to remain unaltered, the input bit sequence used for the addition can be selected variably or at random, while the bit sequence selected for the subtraction may simply be the other bit sequence, or the other way around. The use of this mechanism randomizes the distribution over the shares slightly and therefore has an influence on the number of iterations. FIG. 4 shows a schematic depiction of a method 400 that randomizes which share is to be used for the addition or subtraction.

According to one exemplary embodiment, the logic result 22 has a plurality of bits. Each bit of the logic result is uniquely associated with a bit of the input bit sequence $14_1$ and a bit of the input bit sequence $14_2$. This may be, for example referring again to FIG. 2, the respective bit at the identical bit position $34_i$, with a different unique association also being possible. The processing circuit may be configured to repeatedly perform the steps of gating to obtain the logic result 22, as shown by the While loop in FIG. 3 and FIG. 4, for example. The bit position $34_7$ in FIG. 2 represents a currently examined bit 38, for example. Bits at less significant bit positions $34_1$ to $34_6$ can be regarded as already checked, for example if an order of the check is toward rising bit positions. The processing circuit may, according to exemplary embodiments, be configured to randomize bits of the possibly altered input bit sequences $14_1$ and/or $14_2$ or $14'_1$ and/or $14'_2$ for which the logic result 22 is already checked, for example by means of XORing with a random number.

FIG. 5a shows a schematic depiction of a method 500 for randomizing the already checked bits on the basis of a pseudo code. Compared with the method of FIGS. 3 and 4, the method 500 features, in line 8 and line 13, obtaining a bit mask, this being represented by the expression "getBitMask (AND)", which is explained more specifically in connection with FIG. 6. The bit mask can be understood in simplified terms as a bit sequence that permits operations for some bits and precludes such operations for other bits. Put another way, the bit mask can be used to distinguish which bits have already been processed or scanned and which have not yet, some operations being able to be selectively executed either for already processed bits or for as yet unprocessed bits and not being executed for the other bits, or the other way around. In the present example, the operations are XOR functions, which are permitted for already checked bits and are precluded or prevented for unchecked bits. By way of example, the permitting of the operations is represented by a 1 in the applicable bit sequence. Alternatively, they may also be AND operations that are permitted for unchecked bits.

In other words, the position of the considered bits increases from iteration to iteration, i.e. from repetition to repetition or loop pass. Since the position of the 1-bits (below the considered bit) of both shares is disjunct, the lower share of the bit sequences can already be interpreted as an XOR variant of the bit sequences. Since said bit sequences can remain unaltered by the basic method 300, these bits can be randomized using XOR operations. One opportunity for this is to subject a random value at the lower bits of both shares to an XOR function. This can be repeated in each iteration by using a new random value. Alternatively, an unaltered random value or a deterministic value can be used. The use of this mechanism can lead to (intermediate) shares with a Hamming weight that has a rather random appearance. FIG. 5a shows such a method on the basis of the method 300. In the method 500, the bits below the considered bit are randomized.

Figure 5B:
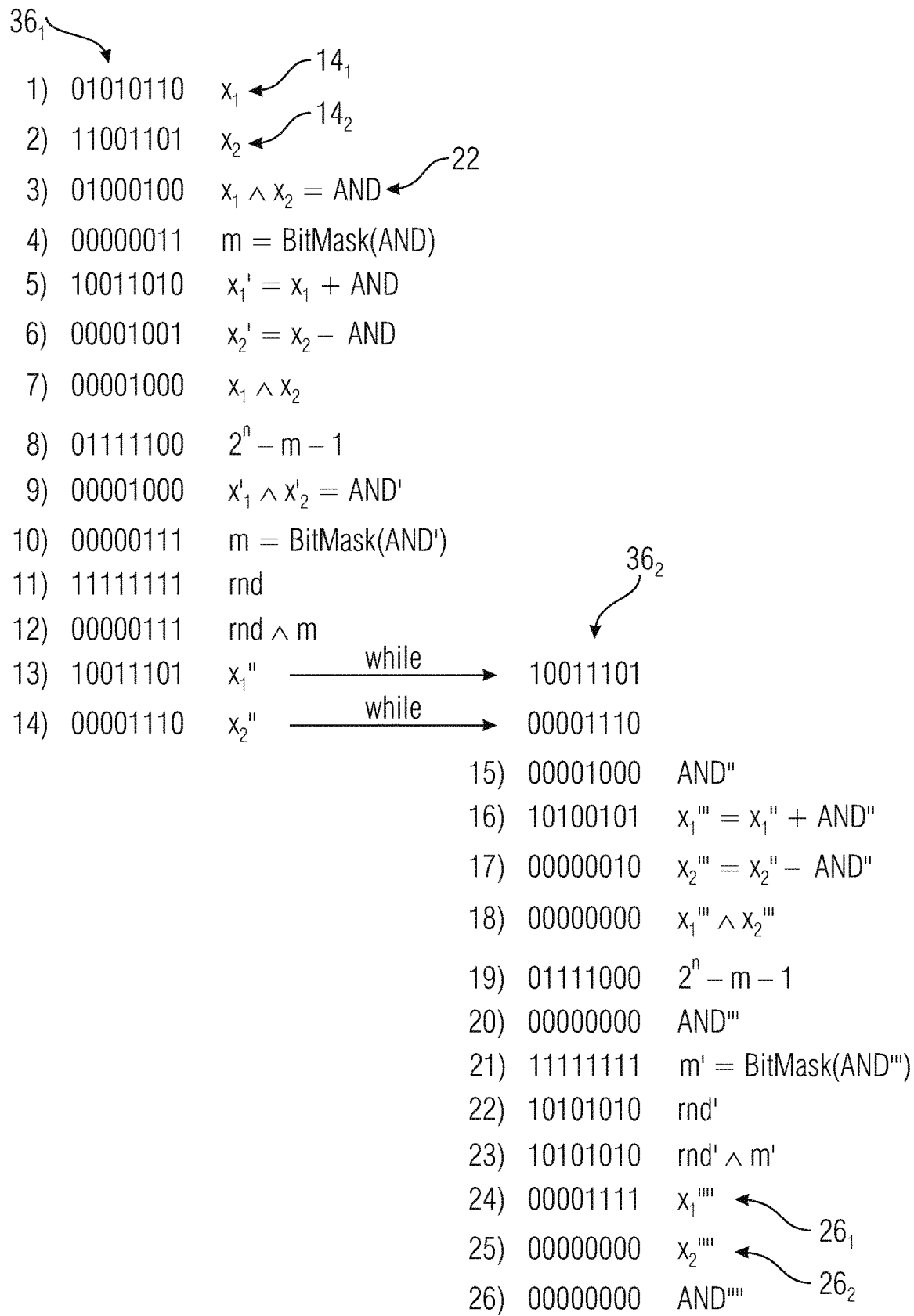

FIG. 5b shows an exemplary depiction of values and variables that can be obtained during a pass of the method 500. By way of example, the input bit sequences $14_1$ and $14_2$ have a length of 8 bits, with any other length being applicable, for example 16 bits, 32 bits or more. Values that are different from multiples of 2 are also possible. It is pointed out that not every one of the lines 1 to 26 needs to be executed as a single method step. Rather, FIG. 5b is used to illustrate the computation operations. The bit mask that can be obtained for example in line 4, line 10 and/or line 21 can be obtained for example based on the method 600 explained in connection with FIG. 6. The random number rnd in line 11 and rnd' in line 22 are chosen at random in this case and can also represent or be any other number.

At the end of the second loop pass, i.e., in line 26, the AND function that is then considered, the logic result, is occupied exclusively by 0-bits, which means that it indicates no further overflow bit position. The input bit sequences $14_1$ and $14_2$ have been altered such that the output bit sequences $26_1$ and $26_2$ are obtained, which meet the requirements of the method.

FIG. 6 schematically shows the sequence of a method 600 that can be used to obtain such a bit mask, for example. The input variable y used in line 1 is a bit sequence having a number of n bits, for example the logic result. An output bit sequence m is defined such that the represented value thereof added to the value 1 immediately corresponds to the value $2^k$, k being the position of the least significant 1-bit in the input bit sequence. With reference to FIG. 2, this is satisfied for the bit position $34_7$, for example. For the bit sequence depicted in FIG. 2 for the logic result, the bit mask can be for example: 0 . . . 0111111. The bit mask can therefore have ones at the bit positions $34_1$ to $34_6$ that are already checked and can have a zero at the other bit positions $34_7$ to $34_n$. Optionally, the bit mask can also have a one at the bit position $34_7$, since a latest check takes place here.

With fresh reference to FIG. 5a, a correction bit sequence 42 can be determined after the addition or subtraction to obtain modified input bit sequences $14'_1$ and $14'_2$. Although the correction bit sequence 42 is likewise reproduced as AND in line 12, it is pointed out that another variable name can also be used. The correction bit sequence is obtained for example by ANDing the changed input bit sequences $14'_1$ and $14'_2$ using additional ANDing with a bit sequence that represents the value $2^n-m-1$, this also being able to be understood to mean that the correction bit sequence 42 for already checked bits is set to 0. In line 14, a random number 44 can be obtained that has for example an identical bit length to the logic result and/or the input bit sequences. The lines 15 and 16 can comprise a selection of these bits from the random number that provide bit positions for which the logic result is already checked, as described by the expressions "rnd/\m". In lines 15 and 16, the changed input bit sequences are, further, XORed with a bit sequence obtained therefrom, which means that the already checked bits at the bit positions $34_1$ to $34_6$ are randomized by XOR functions. Since XOR shares of the secret are already obtained, a further XOR operation is harmless for further usability, but increases the degree of randomness of the bits obtained.

As an alternative or in addition to randomization of already checked bits, the processing device may be configured to randomize bits of the input bit sequences $14_1$ and/or $14_2$, or $14'_1$ and/or $14'_2$, used for which the logic result is unchecked, for example bits at the positions $34_8$ to $34_n$, by performing ANDing with a random number.

In other words, some mechanisms perform randomization of bits below or above the considered bit, i.e. at less significant or more significant bits. An efficient possible way of doing this is to use n random bits and to apply a specific mask in order to erase random bits that are not needed for the randomization, i.e. if the for example lower bits are supposed to be randomized, the random bits at higher positions are erased, and the other way around. The masks used in exemplary embodiments described herein can have the following appearance, for example, and can be derived using the getBitMask method described in FIG. 6: bits below the considered bit are set to 1, while the other bits are set to 0. Therefore, the mask has an appearance such as 0b00 . . . 0011 . . . 11, for example. The position of the least significant 0-bit of the mask is concordant with the position of the considered bit. These masks can then be calculated using the method 600.

FIG. 7 shows a schematic depiction of a pseudo code of a method 700 in which the input bit sequences are converted into the output bit sequences and, further, the aforementioned randomization of unchecked bits is effected. It is likewise possible for the bit mask to be used for this, for example, see line 9. Furthermore, a random number with a concordant bit length can be obtained, see line 10. By gating the random number with the bit sequence, those bits of the random number that have bit positions of the unchecked bits can be selected. The other bit positions, for example already checked bit positions, can be hidden by the applicable gating or set to zero. As depicted in lines 13 and 14 of the method 700, addition or subtraction can be effected with the accordingly masked or filtered random number in order to obtain the randomization of the bit sequences.

The currently checked bit, the Spotlight bit, can according to one exemplary embodiment remain unaltered by the respective XOR or AND randomization. According to one exemplary embodiment, it is also possible for this bit to be randomized, this preferably being taken into consideration for the later processing, however.

In other words, the fundamental method from FIG. 3 can use the AND value in order to modify the higher bits, i.e. the more significant bits, of the two shares. For the algorithm to end, it may be sufficient for the considered bit to be set-up. The more significant bits or bits having a higher value can be set to zero or can be set at random, in order to obtain a high level of security for the side channel analysis. Since the addition or subtraction depicted for example in lines 13 and 14 continues to ensure that the sum of the upper bits remains unaltered, an end of the method is assured as ever in a defined time. The use of this mechanism leads to a more random program flow than the AND values (logic result) and therefore the number of iterations is no longer necessarily deterministically dependent on the input parameter, the input bit sequences. The method 700 describes a modification of the method 300. In particular, the method 700 describes the method 300 in which, additionally, the bits above the considered bit are randomized.

Figures 8, 9:
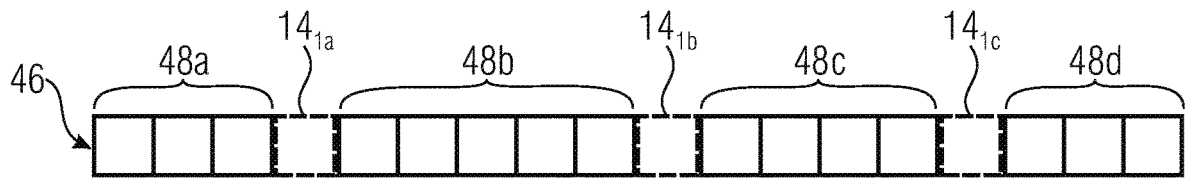
FIG. 8 shows a schematic diagram of an extended input bit sequence according to one exemplary embodiment, into which an input bit sequence broken down into three parts is inserted at different places in the random bit sequence.
FIG. 9 shows a schematic depiction of a method according to one exemplary embodiment in the pseudo code, in which the logic result is obtained by additionally taking into consideration a random number.

According to one exemplary embodiment, the processing circuit is configured to embed at least one of the input bit sequences $14_1$ and/or $14_2$ into a random bit sequence. FIG. 8 shows a schematic diagram of an extended input bit sequence 46 in which the input bit sequence $14_1$ is broken down into three portions 14a, 14b and 14c of the same size or different size and is inserted at different places in the random bit sequence. A number of the portions $14_{1a}$ to $14_{1c}$ and a size, i.e., a number of bits, thereof can be arbitrary. As such, it is possible for just one portion to be used, for example, which means that the input bit sequence $14_1$ can be integrally embedded in the extended input bit sequence 46, possibly at a secret position. Alternatively the input bit sequence $14_1$ may be arranged at different places in the extended input bit sequence 46 in a manner singularized into at least two, at least three, at least four bits or on a bit-by-bit basis. The input bit sequence $14_2$ can be embedded into a further random bit sequence in the same or at least a comparable manner. The processing circuit may be configured to generate the random bit sequences itself or to be provided with them and to embed the input bit sequences into the bit sequences obtained in this manner. In this case, the processing circuit may be configured to segment a random bit sequence obtained in order to obtain segments 48a to 48d and in order to embed the portions $14_{1a}$ to $14_{1c}$ between the segments. Alternatively, the processing device may also be configured to overwrite one or more bits of the random bit sequence obtained with the input bit sequence or individual bits therefrom.

The processing circuit may be configured to provide the extended input bit sequences, which are obtained on the basis of an embedding of the input bit sequence $14_1$ and an embedding of the input bit sequence $14_2$, at an identical bit length. Simple processing of the extended input bit sequences can be obtained if the processing circuit is configured such that the input bit sequences $14_1$ and $14_2$ are positioned or embedded at concordant positions in the respective random bit sequences.

The embedding allows additional disguise of the secret information. A small influence on the actually executed computation operation can be obtained by virtue of the processing circuit being configured such that the extended input bit sequences are provided such that the obtainment of the logic result 22 based on the random bit sequences providing the segments 48 is overflow-free for bits of the input bit sequences $14_1$ and $14_2$. By way of example, a respective most significant bit (MSB) of the portion 48a, 48b, 48c and 48d of at least one of the extended input bit sequences can have a value of logic 0, so that formation of the comparison result over the extended input bit sequences does not result in there being an overflow into the actual concealed input bit sequences $14_1$ and $14_2$. It is thus possible to prevent the input bit sequences from being altered on the basis of random numbers, which could cause a change in the secret information. Alternatively, such an overflow can also be detected and can be corrected in special method steps.

In other words, the method 300 can be added to by virtue of the data section that is to be transformed being embedded into a larger section of pseudo data or random data. When an implementation is taken into consideration, for example on a chip card, there can be the opportunity to perform a template attack on the individual word processed by the CPU. It may therefore be advantageous to embed the original shares in a larger section of random data. An n-bit secret can be embedded in an n+32-bit-data section for example, beginning, for example, with 12 random bits followed by the original n-bit share and a further 20 random bits. A different choice for the same layout for all shares and performance of the same method can lead to a good result for the same layout. The original shares themselves can likewise be split into multiple portions. Two constraints can be observed. All shares can have the same layout, which means the same bit length, and the addition of applicable portions of random bits preferably produces no overflow into the next bit of any portion of the original share, which means a portion of the respective input bit sequence. The use of this mechanism can provide effective protection against side channel analyses. Every word processed in a CPU can contain a number of random bits, and, on top of this, any amount is manageable, which means that the randomness can be safely set.

According to one exemplary embodiment, the processing circuit is configured to add a random number of bits to bits of the logic result that are unchecked, for example, referring again to FIG. 2, the bits at the bit positions $34_8$ to $34_n$, so that a number of the loop passes and hence of repeated performances of the check on the logic result are likewise random-number-based. The randomization of the unchecked upper bits, explained previously in connection with the method 700, can admittedly already provide a certain degree of randomness for the number of the repetitions. This randomness can be increased further by virtue of a certain randomness being inserted into the AND function.

FIG. 9 shows a schematic depiction of a method 900 in the pseudo code that is based on the method 300. In lines 9 and 13, the logic result is obtained, unlike in the method 300, by additionally taking into consideration a random number rnd gated with a further random number msk. The symbol "I" in this case can be understood as follows: $A/B \equiv \overline{A} / \overline{B}$.

This means that in lines 9 and 13 the correction bit sequence is obtained differently than in the method 300. Whereas the random number rnd can have an identical bit length to the input bit sequences $14_1$ and/or $14_2$, the random number msk can be selected from arbitrary values, for example from the values 1 and 3. In the repetitions of the While loop, the random number msk can be doubled in overflow-free fashion in each case in order to produce a different response in a subsequent loop.

In other words, by adding a randomness to the loop condition, it is possible for concealment of the dependency to be obtained. The fundamental method 300 can pass through a loop until the condition $x_1 \wedge x_2 = 0$ is satisfied. The number of iterations therefor is defined by the additive shares provided. Using the additive randomization of the upper bits, it is possible to obtain a certain randomness for the number of iterations that are to be performed. Nevertheless, the dependency between the Hamming weight and the number of iterations can be concealed further, for example by adding a certain randomness to the operation $x_1 \wedge x_2$ before the evaluation of this number in the loop condition. This mechanism can add additional iterations on the basis of randomness, irrespective of the input bit sequences $14_1$ and $14_2$ from the plain data value. This mechanism is set out in FIG. 9 on the basis of the fundamental method shown in FIG. 3 and adds a certain randomness to the loop condition.

According to one exemplary embodiment, the cryptographical apparatus is configured to repeatedly perform the conversion of input bit sequences 14 into output bit sequences 26. This means that, possibly at different times, different groups of input bit sequences can be obtained and converted into respective groups of output bit sequences. The cryptographical apparatus, for example the cryptographical apparatus 10, may be configured to obtain a plurality of logic results that corresponds to the number of groups, for example by virtue of the logic result 22 being obtained whenever new input bit sequences are received. The cryptographical apparatus may be configured to apply the respective method such that a constant period is always needed for different pairs or groups of input bit sequences in order to convert them into the output bit sequences. This allows further disguise of information.

Figure 10:
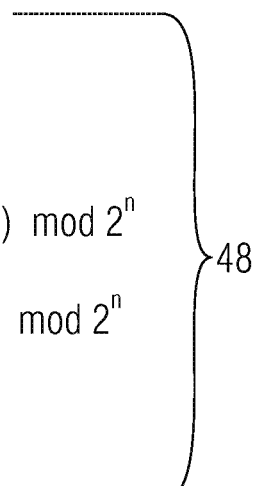
FIG. 10 shows a schematic depiction of a method providing a way of implementing this exemplary embodiment.

FIG. 10 shows a schematic depiction of a method 1000 that provides a way of implementing this exemplary embodiment. The method 1000 can differ from the method 300 in that, instead of a loop condition that the logic result is not equal to 0, an alternative While loop 48 is used that for example performs a loop pass i for each of the n bits of the input bit sequences. This means that, irrespective of whether the logic result has a particular value or indicates an overflow bit position, a particular operation of the gating can be performed. This means that the processing circuit may be configured so as, for each bit of the logic result, while retaining a summed value comprising a first value represented by the first input bit sequence and a second value represented by the second input bit sequence, to increase one from the first value and the second value and to decrease the other value, in order to alter the plurality of logic results with a constant period. The plurality of output bit sequences can thus be obtained with a constant period. In other words, constant timing can be used by virtue of a maximum number of iterations being enforced, which means it is always possible for n iterations to be performed. A method having a constant performance time or execution time, possibly still depending on the number of n bits, can have a level of independence of the secret and the provided distribution thereof over additive shares. Since a constant execution time or in this case a number of iterations is always supposed to fit all exceptions, the execution time of this method can be increased, while a better side channel resistance can be obtained. Constant timing can be achieved by means of multiple mechanisms. One method can involve explicitly setting a bit to the AND value or performing XORing of a 1-bit mask (bit mask that has a 1-value at one place) that is initialized by 1 and shifted one position to the left (mod $2^n$) in each iteration/repetition. Another possibility involves simply performing a number of n iterations, as shown by the method 1000. The method 1000 therefore describes the method 300 with constant timing.

FIG. 11 shows a schematic depiction of a method 1100 according to one exemplary embodiment, which is performable by the cryptographical apparatus 10 for example. In comparison with the method 300, a window technique can be used in order to select and process at least a first bit and a second bit of the logic result in a respective loop pass. This means that the processing circuit may be configured to take a window function, which selects at least a first and a second bit of the logic result for a respective loop pass over a plurality of loop passes variably over time, as a basis for determining bits for the loop pass of the first input bit sequence and/or the second input bit sequence. The processing circuit may be configured to alter the selected bits in the first input bit sequence and/or the second input bit sequence during the loop pass. As such, for example in line 7 of the method 1100, a value msk is set to 3, which can also correspond to a binary representation of 11. While this value that still needs to be altered is not equal to 0, a While loop 52 can be performed that may be dependent on the loop condition of the method 300. In particular, the value msk can be used for gating with the input bit sequences and/or the logic result, as depicted in lines 9 and 10, for example. On the basis of this, the input bit sequences and auxiliary variables are also influenced, as depicted in lines 11 to 13.

The value msk=3, i.e. 11 in binary representation, can mean a window function of length two, which means two bits are considered at one time or in one repetition. As is evident from line 15, this window can be shifted two bits to the left at the end of the loop, which means that two adjacent bits are considered in a subsequent loop. Although the window function is described such that it has a length of two bits, it is also possible for a different length to be used, the length being able to be limited to the number of n bits of the input bit sequence or to the number of bits of the supplemented or extended input bit sequence. In other words, a window technique can be used in order to process more than one bit at once, e.g. always two bits at the same time. The use of a window technique processing more than one bit at once in one iteration can provide protection against side channel analysis. Without restricting the generality, a method that uses a window using two bits can be provided. Independently of this, the logic can be extended to larger windows. The method 1100 shows the use of a window technique and the obtainment of constant timing, since the window is moved over the complete bit length.

FIG. 12 shows a schematic diagram to illustrate the window function msk. The gating of the input bit sequence i.e., the input bit sequence $14_1$, with the window msk, which is depicted in line 9 in the method 1000, can lead to the selection of two bits for the input bit sequence $14_1$. In a first loop pass, the window msk (1) can be used. By shifting it two positions to the left, see line 15 of the method 1100, two adjacent bits can be selected. Renewed shifting allows the selection, again, of different bits in a third loop pass, as indicated by msk (3).

Some of the exemplary embodiments described above describe gating of a first input bit sequence with a second input bit sequence. The present disclosure is not restricted to the use of just two input bit sequences, but rather can be embodied with an arbitrary number of input bit sequences, for example more than 2, more than 3, or more than 4, for example 5, 10 or 20.

The text below refers in exemplary fashion to exemplary embodiments for gating three input bit sequences to obtain three output bit sequences and for gating four input bit sequences to obtain four output bit sequences.

FIG. 13 shows a schematic depiction of a pseudo code for implementing a method 1300. A possible difference between the method 1300 and the method 300 can be seen in the calculation of the correction bit sequence or of the logic result 22 in line 10 of the pseudo code. Whereas the method 300 is described such that the logic result 22 can be obtained by ANDing the two input bit sequences $14_1$ and $14_2$, the method 1300 is matched to the increased number of input bit sequences $14_1$ to $14_3$ to the effect that multiple pairings of input bit sequences are checked by ANDing. By way of example, all of the pairs are ANDed, which means the input bit sequences $14_1$ and $14_2$, $14_2$ and $14_3$ and $14_3$ and $14_1$. This ANDing delivers, as ever, the information content regarding whether the two input bit sequences compared as a pairing have a concordant 1 or 1-bit at a concordant position that could cause an overflow in the event of arithmetic addition of the three input bit sequences $14_1$ to $14_3$. By XORing these paired results, an aggregation of this information in one bit can be obtained, which means that, as ever, the logic result 22 uses a logic 1 to indicate that an arithmetic addition of the input bit sequences $14_1$ $14_2$ and $14_3$ would overflow.

Although it is possible for the three input bit sequences $14_1$ to $14_3$ to be changed on the basis of an indicated overflow bit position, it is also possible, in connection with the disclosure of the other exemplary embodiments, for just a change to two input bit sequences to be made. Referring again to FIG. 2, for example the increase in the value of the input bit sequence $14_1$ and the simultaneous decrease in the value of the input bit sequence $14_2$ at the same bit position, for example the bit position $34_7$, can lead to neither of the input bit sequences $14_1$ and $14_2$ having a 1. Referring to the method 1300, it becomes clear that a single input bit sequence $14_1$, $14_2$ and $14_3$ cannot independently produce an overflow if the other input bit sequences have a logic 0 at the same bit position.

The correction bit sequence m can be obtained by obtaining the bit mask using the method 600, the function argument used being able to be the logic result multiplied by the value 2, this corresponding to a shift of the logic result one bit position to the left. As is evident from lines 12 to 19, repeated adaptation of at least second instances of the three input bit sequences can be performed, for example the input bit sequences $14_1$ and $14_2$ processed in the changeable variable $x_1$ and $x_2$. In this case, the input bit sequence $14_1$ can be added to the logic result and additionally to the value of the correction bit sequence or bit mask and additionally to the value 1. The input bit sequence $14_2$ can have the value of the logic result deducted from it. The addition of the logic result to m and to the value 1 may be synonymous with a doubling of the logic result. The bit sequence m has a value of 1 for all bit positions that have already been checked, and also the bit position that is currently being checked. An additional addition to the value 1 leads to a 1 in the bit sequence m at the first bit position that is not yet checked, for example the bit position $34_8$ in FIG. 2.

Lines 16 and 17 and also 18 describe the recalculation of the intermediate variables for the next loop pass, which means the next repetition. The third input bit sequence, for example the input bit sequence $14_3$, may be a further additive share of the secret, but may also be a random number. Further, the input bit sequence $14_3$ as a random number can itself be generated by the apparatus, for example the cryptographical apparatus 10. Use of a random share allows randomization of the result.

In other words, the method 1300 shows a possible way of performing the algorithmic logic with more than two input bit sequences. Some values in plain form have a limited amount of possible distributions over two additive shares. From a side channel analysis perspective, it may therefore be advantageous to use an (or multiple) additional share(s). Without limiting the generality, this improvement is described using three shares, which means an additional share. Beginning with two additive shares, an initial split into three additive shares may be the first step. The addition/subtraction of the method can continue to be performed using just two shares. The AND value used can be derived easily. The fundamental method shown in FIG. 3 may be configured such that AND is computed by applying the logic AND operation to the two shares. The bits that are set to AND represent the bit positions that would produce an overflow to a higher bit if the two shares are added. In general, this means that AND has a 1-bit for each bit position and only if two (or more) shares have a 1-bit at the specific position. Such calculating of the value to be added/subtracted can lead to a method that performs the transformation using three shares. The use of this mechanism leads to a random algorithm, since all modifications performed using two shares have nothing to do with the plain data, since a third randomly chosen share continues to be taken into consideration. The method 1300 is in this respect a modification of the method 300.

Further modifications are likewise possible. As such, it may be sufficient to modify just one of the bit sequences. An applicable configuration of an exemplary embodiment of this kind is described with reference to FIG. 14, which shows a schematic depiction of a method 1400 in the pseudo code. In contrast to the method 1300, the processing device may be configured to calculate the correction bit sequence 42 based on the form 2*(AND A m) and to add the correction bit sequence 42 to the input bit sequence 141. The correction bit sequence 42 is based for example on an ANDing of the bit mask obtained using the method 600 with the logic result. The bit mask has a value of logic 0 at unchecked bit positions, so that, starting from the overflow position, more significant bits of the logic bit sequence are ignored. Multiplication by the value 2 sets the respective directly more significant bit to 1 in order to compensate for an overflow. This can lead to bits already taken into consideration remaining at zero and a further operation, both by virtue of ANDing and by virtue of arithmetic addition, remaining without effect for these ignored bits. Further, at a place at which the logic result 22 indicates an overflow bit position, the effect can be compensated for by virtue of a 1 being added at the next highest bit position and thus the overflow being prevented. In other words, FIG. 14 shows a schematic depiction of a method that uses three shares in a further version.

FIG. 15 shows a schematic depiction of a method 1500 according to one exemplary embodiment, in pseudo code. The method 1500 is configured such that four input bit sequences $14_1$ to $14_4$ are used. The method 1500 can be configured such that a first logic result $22_1$ and a second logic result $22_2$ are used, as depicted in lines 13 and 14. The logic result $22_1$ can be obtained in analogous fashion to the logic result 22 using the methods 1300 and 1400, which means that the input bit sequences are ANDed in pairs and the individual results are XORed.

The second logic result $22_2$ can be obtained by ANDing the four input bit sequences $14_1$ to $14_4$ bit by bit.

In the different logic results $22_1$ and $22_2$, the four respective input bit sequences $14_1$ to $14_4$ are gated with one another in different ways. The processing circuit may be configured to change at least a first and a second input bit sequence by using the logic result $22_1$ and/or by using the logic result $22_2$, in order to prevent or compensate for the occurrence of the overflow. According to the method 1500, the first input bit sequence can be changed by using the two logic results $22_1$ and $22_2$. The input bit sequence $14_2$ can be changed by using the logic result $22_2$. It is possible for just one of these steps to be performed, for an association between the logic results that are to be used and the input bit sequences to be transposed or changed or for other input bit sequences to be used. Alternatively or additionally, it is possible to use other computation operations too.

As depicted in line 17, the input bit sequence $14_1$ can be changed by virtue of arithmetic addition of the logic result $22_2$ to the value $2^n-1$ being effected, which means 1-bits at any position. This value can be subjected to ANDing with the bit mask m, which can be obtained using the method 600. The result can be shifted one bit position to the left, corresponding to multiplication by the value 2. The result obtained therefrom can be subjected to ANDing with the logic result $22_1$, and a bit sequence obtained therefrom, or a value represented thereby, can be added to a value of the input bit sequence $14_1$. This can be effected in overflow-free fashion, which means that the operation mod 2n can be used. The input bit sequence $14_2$ can, as depicted in line 18, be obtained by ANDing the bit sequence of the logic result $22_2$ with the bit mask m by virtue of this result additionally being shifted two bit positions to the left. The result can likewise be added, specifically to the input bit sequence $14_2$.

Freedom from overflow can be obtained by virtue of the modulo $2^n$ operation. It is therefore possible for an addition to be applied to both input bit sequences. An addition described herein can also be performed as a subtraction, which is performed using an inverse value of the summand.

Exemplary embodiments described herein may be configured such that the logic result, which can have information regarding the data to be kept secret, is not part of the output bit sequences. This means that a calculation is effected on coded or encrypted information without having to perform decryption, which is advantageous in regard to secrecy.

Exemplary embodiments therefore relate to the alteration of the shares of a secret such that the arithmetic addition thereof is overflow-free. The pseudo codes depicted in the methods described can be implemented in any programming language and/or produced entirely or partly as hardware circuits. Although the methods described herein are described as respective standalone methods, the methods 400, 500, 700, 900, 1000, 1100, 1300, 1400 and/or 1500 can be combined individually or in combination with the method 1300 and/or introduced to other combinations. In particular, the individual developments obtained thereby can be combined with one another arbitrarily, since the mechanisms do not adversely affect one another. Exemplary embodiments provide mechanisms for how the side channel resistance can be improved as a core objective when dealing with different masking schemes. The basic mechanisms, for example FIG. 3, can be implemented such that a function of the underlying system is not adversely affected, but nevertheless a high level of side channel resistance is obtained. One aspect of exemplary embodiments described herein involves iteratively modifying shares from additive shares to shares with an XOR function while continuous refreshing of the complete data is performed. Exemplary embodiments can be used wherever a transformation from addition to XOR is necessary. Depending on the instance of use, a specific combination of the provided mechanisms can be selected and applied. Some exemplary embodiments can comprise parts of an implementation of an SHA (Secure Hash Algorithm) method, which provides advanced side channel protection. In this case, the implementation can be based on a permanent split of secret data over at least two shares. To retain the permanent split, a transformation of the masking can be used, since both addition and XOR operations need to be performed on secret data.

Figure 16:
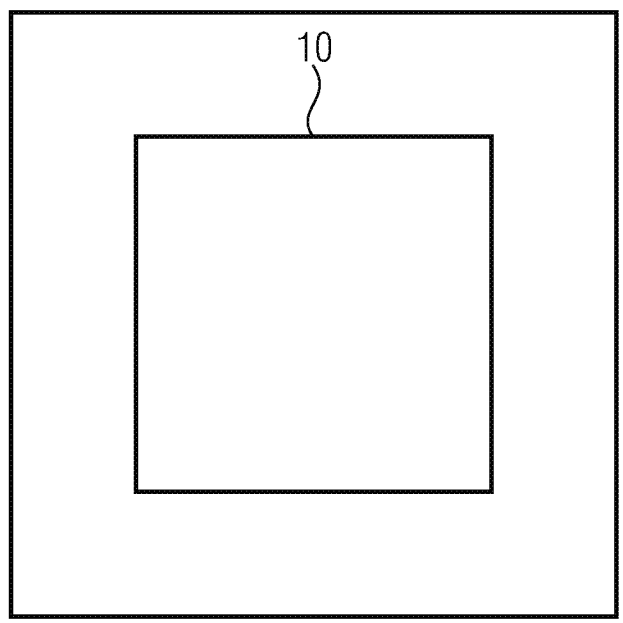
FIG. 16 shows a schematic block diagram of a system according to one exemplary embodiment.

FIG. 16 shows a schematic block diagram of a system 160 according to one exemplary embodiment, which comprises the cryptographical apparatus 10. The cryptographical apparatus 10 may be configured to implement at least one of the exemplary embodiments described herein in connection with the methods 300, 400, 500, 700, 900, 1000, 1100, 1300, 1400 and/or 1500.

A method for converting input bit sequences whose overflow-free arithmetic addition results in a secret into output bit sequences whose logic XORing results in the secret comprises providing at least a first input bit sequence and a second input bit sequence. The method comprises a) gating the first input bit sequence and the second input bit sequence to obtain a logic result indicating overflow bit positions at which both the first input bit sequence and the second input bit sequence have a value of one. The method further comprises b) changing the first input bit sequence and/or the second input bit sequence at at least one overflow bit position. The method comprises repeatedly performing steps a) and b) by using the respectively changed input bit sequences until the logic result indicates no further overflow bit position and the output bit sequences are obtained.

The exemplary embodiments described herein solve problems in regard to questions, for example how dummy data can be generated and/or derived efficiently on a CPU and how dummy instructions or operations for masking are integratable into the code flow, so that they are undistinguishable. According to exemplary embodiments described herein, a gating is merely produced that is obtained for the purpose of deriving information but that can be discarded again after the output bit sequences are obtained. Exemplary embodiments consider secure coding rules, and at the same time allow a high level of productivity for the method performance, in software and/or hardware.

The methods 400, 500, 700, 900, 1000, 1100, 1300, 1400 and 1500 have been used to describe multiple options for how the method 300 can be improved in regard to side channel analysis. The improvements comprise
1. Randomizing which share is used for addition and subtraction;
2. Randomizing bits at lower positions than the latest considered bit position in an XOR manner;
3. Randomizing bits at higher positions than the latest considered bit position in an additive manner;
4. Performing the algorithmic logic on more than two shares;
5. The data section to be transformed can be embedded in a larger section of pseudo/random data.

The Hamming weight of the plain value is not independent of the average Hamming weight of the AND value/AND values. Therefore, the Hamming weight influences the execution time of the algorithm, i.e. the probability distribution of performed iterations. Since this relationship can be observed and possibly used by an attacker to obtain information, there are additionally measures for improving the side channel response:
6. Concealing the dependence by adding a certain randomness to the loop condition;
7. Using constant timing by enforcing a maximum number of iterations, i.e. n iterations are always performed; and
8. Using a window technique to process more than one bit at once, e.g. two bits are always processed at the same time.

The mechanisms of all of these improvements are independent of one another and can therefore be applied independently and/or combined with one another.

Although some aspects have been described in connection with an apparatus, it goes without saying that these aspects also represent a description of the corresponding method, such that a block or a component of an apparatus is also intended to be understood as a corresponding method step or as a feature of a method step. Analogously to this, aspects that have been described in connection with a or as a method step also represent a description of a corresponding block or detail or feature of a corresponding apparatus.

Depending on particular implementation requirements, exemplary embodiments of the invention may be implemented in hardware or in software. The implementation can be performed using a digital storage medium, for example a floppy disk, a DVD, a Blu-ray disk, a CD, a ROM, a PROM, an EPROM, an EEPROM or a FLASH memory, a hard disk or some other magnetic or optical memory on which electronically readable control signals are stored that can interact or do interact with a programmable computer system such that the respective method is performed. Therefore, the digital storage medium can be computer-readable. Some exemplary embodiments according to the invention thus comprise a data carrier that has electronically readable control signals capable of interacting with a programmable computer system such that one of the methods described herein is performed.

Generally, exemplary embodiments of the present invention may be implemented using a computer program product having a program code, wherein the program code is effective for performing one of the methods when the computer program product runs on a computer. The program code may be stored on a machine-readable carrier too, for example.

Other exemplary embodiments comprise the computer program for performing one of the methods described herein, wherein the computer program is stored on a machine-readable carrier.

In other words, an exemplary embodiment of the method according to the invention is thus a computer program that has a program code for performing one of the methods described herein when the computer program runs on a computer. A further exemplary embodiment of the methods according to the invention is therefore a data carrier (or a digital storage medium or a computer-readable medium) on which the computer program for performing one of the methods described herein is recorded.

A further exemplary embodiment of the method according to the invention is therefore a data stream or a sequence of signals representing the computer program for performing one of the methods described herein. The data stream or the sequence of signals may be configured, for example, for being transferred via a data communication connection, for example via the Internet.

A further exemplary embodiment comprises a processing device, for example a computer or a programmable logic component, which is configured or adapted for performing one of the methods described herein.

A further exemplary embodiment comprises a computer on which the computer program for providing one of the methods described herein is installed.

In some exemplary embodiments, a programmable logic component (for example a field programmable gate array, an FPGA) can be used to perform some or all functionalities of the methods described herein. In some exemplary embodiments, a field programmable gate array can interact with a microprocessor in order to perform one of the methods described herein. Generally, in some exemplary embodiments the methods are performed on the part of an arbitrary hardware apparatus. The latter can be universally usable hardware such as a computer processor (CPU) or hardware specific to the method, such as an ASIC, for example.

The exemplary embodiments described above are merely an illustration of the principles of the present invention. It goes without saying that modifications and variations of the arrangements and details described herein will be apparent to other persons skilled in the art. Therefore, it is intended that the invention should only be restricted by the scope of protection of the patent claims below and not by the specific details that have been presented on the basis of the description and the explanation of the exemplary embodiments herein.

What is claimed is:

1. A cryptographical apparatus for converting input bit sequences, whose overflow-free arithmetic addition results in a secret, into output bit sequences whose logical XORing results in the secret, the cryptographical apparatus comprising:
    a data interface for providing at least a first input bit sequence and a second input bit sequence;
    a processing circuit configured to
    a) gate the first input bit sequence and the second input bit sequence so as to obtain a logic result indicating each overflow bit position at which both the first input bit sequence and the second input bit sequence have a value of one; and to
    b) change the first input bit sequence and/or the second input bit sequence at least one overflow bit position;
    wherein the processing circuit is configured to repeatedly perform steps a) and b) by using the respectively changed input bit sequences, until the logic result indicates no further overflow bit position and the output bit sequences are obtained.

2. The cryptographical apparatus of claim 1, in which the processing circuit is configured to change the first input bit sequence and/or the second input bit sequence at the at least one overflow bit position such that an XOR logic result of the output bit sequences corresponds to an arithmetic addition result of the input bit sequences mod 2n, where n is the number of bits of the first input bit sequence and of the second input bit sequence.

3. The cryptographical apparatus of claim 1, which is formed as a security controller.

4. The cryptographical apparatus of claim 1, in which the processing circuit is configured to change the first input bit sequence and/or the second input bit sequence at the at least one overflow bit position by increasing the value represented by the input bit sequence.

5. The cryptographical apparatus of claim 1, wherein the processing circuit is configured to gate at least a third input bit sequence with the first input bit sequence and the second input bit sequence in order to obtain the logic result.

6. The cryptographical apparatus of claim 5, in which the processing circuit is configured to generate the third input bit sequence as a random number.

7. The cryptographical apparatus of claim 1, in which the processing circuit is configured to change the first input bit sequence and/or the second input bit sequence at the at least one overflow bit position by calculating a correction bit sequence based on the logic result and adding either the first input bit sequence or the second input bit sequence to the correction bit sequence.

8. The cryptographical apparatus of claim 7, in which the processing circuit is configured to calculate the correction bit sequence based on the rule $$2*(AND \wedge m),$$

where AND is a logic bit sequence representing the logic result, and where m is a bit mask, based on which, starting from the overflow position, more significant bits of the logic bit sequence are ignored.

9. The cryptographical apparatus of claim 1, in which the data interface is configured to provide at least a first, second, third and fourth input bit sequence;
    wherein the processing circuit is configured to
    a) gate the first to fourth input bit sequences in a first manner in order to obtain a first logic result, and to gate the first to fourth input bit sequences in a second manner in order to obtain a second logic result, and to
    b) change at least one of the first and second input bit sequences by using the first logic result and/or at least one of the first and second input bit sequences by using the second logic result.

10. The cryptographical apparatus of claim 1, in which the processing circuit is configured to change the first input bit sequence and the second input bit sequence at the at least one overflow bit position by calculating a correction bit sequence based on the logic result, adding the correction bit sequence to one of the first and second input bit sequences and subtracting said correction bit sequence from the other input bit sequence or adding it to an inverse correction bit sequence.

11. The cryptographical apparatus of claim 10, in which the processing circuit is configured to obtain the output bit sequences such that an arithmetic addition result from input values represented by the input bit sequences and an arithmetic addition result from output values represented by the output bit sequences are the same.

12. The cryptographical apparatus of claim 1, in which the processing circuit is configured to obtain the logic result based on a bit-by-bit ANDing of the first input bit sequence and the second input bit sequence, wherein the logic result indicates the at least one overflow position at bit positions that have a logic 1.

13. The cryptographical apparatus of claim 1, in which the processing circuit is configured to repeatedly analyze the logic result starting from a least influential bit of the logic result through to a most influential bit and to increase a value represented by the first input bit sequence and to decrease a second value represented by the second input bit sequence if the logic result corresponds to a predefined value at the analyzed place, and to leave the first value and the second value unchanged if the logic result does not correspond to the predefined value at the analyzed place.

14. The cryptographical apparatus of claim 1, in which the processing circuit is configured to decrease a value represented by the first input bit sequence in a first loop pass and to use the obtained bit sequence with the decreased value as an input bit sequence in a later second loop pass, wherein the processing circuit is configured to increase the decreased value in the second loop pass.

15. The cryptographical apparatus of claim 14, in which the processing circuit is configured to infer from a random number whether the value represented by the first input bit sequence is decreased or increased during the second loop pass.

16. The cryptographical apparatus of claim 1,
wherein the logic result has a plurality of bits, wherein each bit of the logic result is uniquely associated with a bit of the first input bit sequence and a bit of the second input bit sequence;
wherein the processing circuit is configured to repeatedly perform steps a) and b) in order to repeatedly check the logic result, for each bit of the logic result, for the presence of an overflow bit position;
wherein the processing circuit is configured to randomize bits of the first input bit sequence and/or bits of the second input bit sequence, for which the logic result is already checked, by means of XORing with a random number.

17. The cryptographical apparatus of claim 1,
wherein the logic result has a plurality of bits, wherein each bit of the logic result is uniquely associated with a bit of the first input bit sequence and a bit of the second input bit sequence;
wherein the processing circuit is configured to repeatedly perform steps a) and b) in order to repeatedly check the logic result, for each bit of the logic result, for the presence of an overflow bit position;
wherein the processing circuit is configured to randomize bits of the first input bit sequence and/or bits of the second input bit sequence for which the logic result is unchecked by means of ANDing with a random number.

18. The cryptographical apparatus of claim 1, in which the processing circuit is configured to obtain a first random bit sequence and a second random bit sequence, to embed the first input bit sequence into the first random bit sequence, to obtain an extended first input bit sequence, to embed the second input bit sequence into the second random bit sequence, to obtain an extended second input bit sequence, wherein the processing circuit is further configured to obtain the logic result based on a gating of the extended first input bit sequence and the extended second input bit sequence.

19. The cryptographical apparatus of claim 18, in which the processing circuit is configured to provide the first extended input bit sequence and the second extended input bit sequence having an identical bit length, and to position the first input bit sequence in the first extended input bit sequence and the second input bit sequence in the second extended input bit sequence at a concordant position within the respective extended bit sequence.

20. The cryptographical apparatus of claim 18, in which the processing circuit of the logic gates is configured to provide the first extended input bit sequence and the second extended input bit sequence such that the obtainment of the logic result based on the first and second random bit sequences is overflow-free for bits of the first and second input bit sequences.

21. The cryptographical apparatus of claim 1,
wherein the logic result has a plurality of bits, wherein each bit of the logic result is uniquely associated with a bit of the first input bit sequence and a bit of the second input bit sequence;
wherein the processing circuit is configured to repeatedly perform steps a) and b) in order to repeatedly check the logic result, for each bit of the logic result, for the presence of an overflow bit position;
wherein the processing circuit is configured to add a random number of bits to bits of the logic result that are unchecked, so that a number of repeated performances of steps a) and b) is random-number-based.

22. The cryptographical apparatus of claim 1, which is configured to obtain a plurality of at least first and second input bit sequences, to obtain a corresponding plurality of logic results and to change a corresponding plurality of first input bit sequences and/or second input bit sequences at overflow bit positions, and to obtain a corresponding plurality of output bit sequences, wherein the processing circuit is configured to generate the plurality of output bit sequences in a respectively constant period.

23. The cryptographical apparatus of claim 22, in which the processing circuit is configured so as, for each bit of the logic result, while retaining a summed value comprising a first value represented by the first input bit sequence and a second value represented by the second input bit sequence, to increase one from the first value and the second value and to decrease the other value, in order to alter the plurality of logic results with a constant period and thus to obtain the plurality of output bit sequences with the constant period.

24. The cryptographical apparatus of claim 1, in which the processing circuit is configured to take a window function, which selects at least a first and a second bit of the logic result for a respective loop pass over a plurality of loop passes variably over time, as a basis for determining bits for the loop pass of the first input bit sequence and/or the second input bit sequence, wherein the processing circuit is configured to alter the selected bits in the first input bit sequence and/or the second input bit sequence during a loop pass.

25. The cryptographical apparatus of claim 1, in which the logic result is not part of the output bit sequences.

26. The cryptographical apparatus of claim 1, in which the processing circuit is configured to use a changed bit sequence obtained in step b) of a first loop pass as an input bit sequence of a subsequent second loop pass.

* * * * *